(12) United States Patent
Wells (10) Patent No.: US 7,695,022 B2
(45) Date of Patent: Apr. 13, 2010

(54) FLUID COUPLING CAP

(75) Inventor: Michael P. Wells, Bowling Green, OH (US)

(73) Assignee: Eaton Corporation, Cleveland, OH (US)

( * ) Notice: Subject to any disclaimer, the term of this patent is extended or adjusted under 35 U.S.C. 154(b) by 619 days.

(21) Appl. No.: 11/170,810

(22) Filed: Jun. 30, 2005

(65) Prior Publication Data

US 2007/0001459 A1    Jan. 4, 2007

(51) Int. Cl.
*F16L 35/00* (2006.01)
(52) U.S. Cl. .................. 285/239; 285/45; 285/331; 285/374; 285/901; 285/924; 138/89.1; 138/94
(58) Field of Classification Search ............ 285/23, 285/45, 239, 331, 351, 374, 901, 924; 138/89.1, 138/89.2, 89.3, 89.4, 92, 94
See application file for complete search history.

(56) References Cited

U.S. PATENT DOCUMENTS 4,004,614 A * 1/1977 Mackal et al. ............. 138/89.2
4,768,551 A   9/1988 Allread et al.
5,195,561 A * 3/1993 Wilson ...................... 138/89.2

FOREIGN PATENT DOCUMENTS

WO    WO 01/38773 A1 * 11/2000

* cited by examiner

*Primary Examiner*—Aaron M Dunwoody
*Assistant Examiner*—Fannie Kee
(74) *Attorney, Agent, or Firm*—Sonu N. Weaver (57) ABSTRACT

A cap for a fluid coupling is provided that includes a stem member adapted for insertion into the fluid coupling and a cover member connected to the stem member. The cover member includes an internal cavity sized to receive the fluid coupling such that the fluid coupling is positioned between the stem member and the cover member. The internal cavity is defined by a wall having at least one of a longitudinally extending groove and a longitudinally extending protrusion.

2 Claims, 2 Drawing Sheets

FIG 1

FLUID COUPLING CAP

BACKGROUND OF THE INVENTION

1. Field of the Invention

The present invention relates generally to fluid couplings and to a dust and impact protection cap for a fluid coupling.

2. Description of the Related Art

There are many applications where a fluid power system requires that a connection be made between a hose assembly and an apparatus, such as a tank, reservoir, pump, motor or valve. In one arrangement, a male fluid coupling is connected to the apparatus and functions as a port to which a hose-secured female fluid coupling may be connected. When disconnected from the female fluid coupling, the male fluid coupling is covered with a cap to protect it from dust, dirt and other debris. Since male fluid couplings may protrude from the apparatus, caps also protect the male fluid coupling from damage due to impacts with other objects. Among other things, it is improvement of this cap that is the subject of the invention set forth herein.

SUMMARY OF THE INVENTION

A cap for a fluid coupling is provided that includes a stem member adapted for insertion into the fluid coupling and a cover member connected to the stem member. The cover member includes an internal cavity sized to receive the fluid coupling such that the fluid coupling is positioned between the stem member and the cover member. The internal cavity is defined by a wall having at least one of a longitudinally extending groove and a longitudinally extending protrusion. A fluid coupling assembly that includes a cap according to an embodiment of the present invention is also provided. Other aspects of the invention will be apparent to those skilled in the art after review of the drawings and detailed description provided below.

BRIEF DESCRIPTION OF THE DRAWINGS

Embodiments of the invention will now be described, by way of example, with reference to the accompanying drawings, wherein.

DETAILED DESCRIPTION

Figure 1:
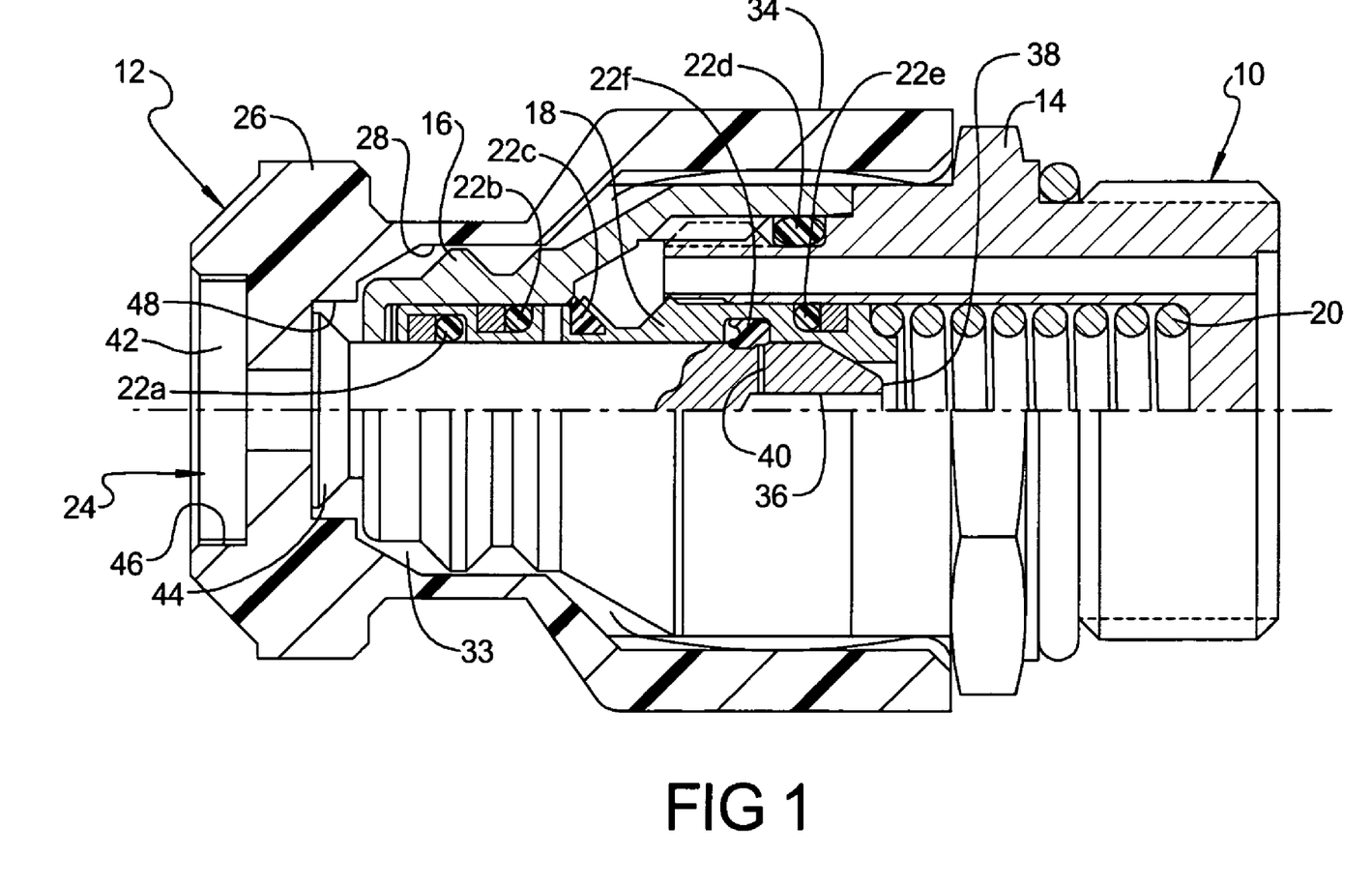
FIG. 1 is a partial cross-sectional view of a fluid coupling and a cap according to an embodiment of the present invention.

Referring to FIG. 1, a fluid coupling assembly is shown that includes an exemplary fluid coupling 10 and a cap 12 according to an embodiment of the present invention. By way of reference, fluid coupling 10 is a "male" fluid coupling that includes an adapter 14 for connecting fluid coupling 10 to an apparatus, such as a pump, motor or valve, and a body member 16 that secures a valve 18 for movement within adapter 14 against the biasing force of a spring 20. Fluid coupling 10 includes various seals 22a-22f that function to inhibit leakage of fluid when fluid coupling 10 is connected to cap 12 or a separate mating fluid coupling (not shown). Fluid coupling 10 may be used to provide a port in an apparatus for connecting a fluid conveying component, such as, for example, a hydraulic hose having a mating fluid coupling. When not connected to a mating fluid coupling, cap 12 covers fluid coupling 10 to inhibit the ingression of dust, dirt and other debris into fluid coupling 10, while providing protection against impacts.

In the embodiment shown in FIG. 1, cap 12 includes a generally cylindrical stem member 24 adapted for insertion into fluid coupling 10, and a cover member 26 connected to stem member 24. Cover member 26 includes an internal cavity 28 sized to receive body 16 of fluid coupling 10 such that fluid coupling 10 is positioned between stem member 24 and cover member 26.

Figure 2:
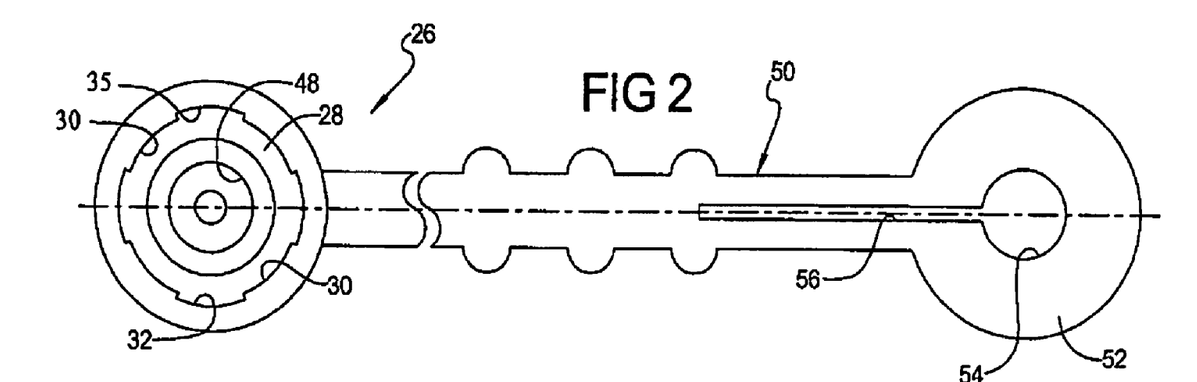
FIG. 2 is bottom view of a cover member for use in the cap of FIG. 1.
Figure 3:
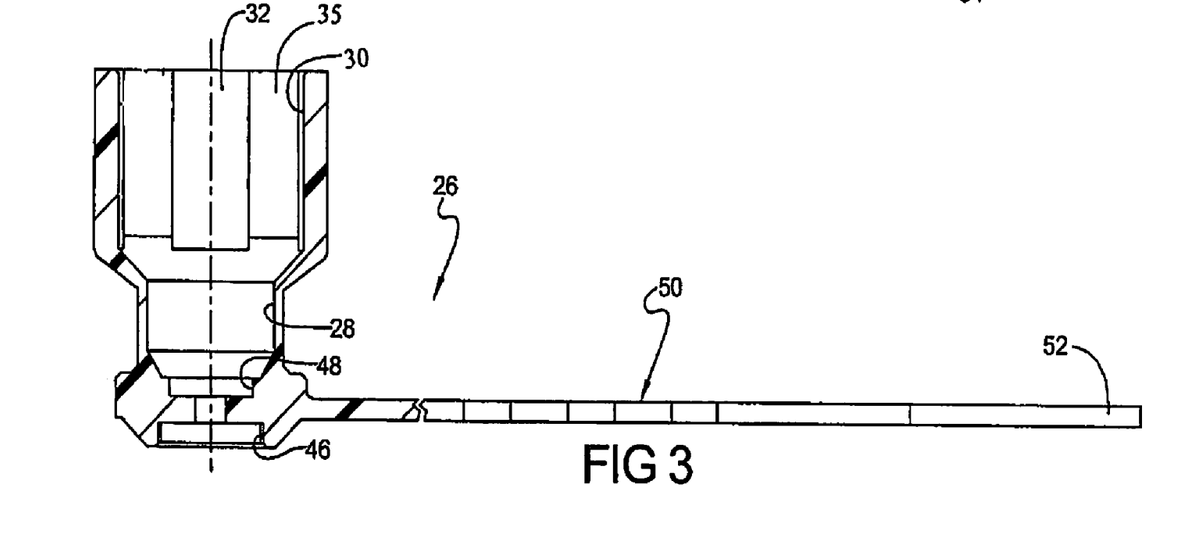
FIG. 3 is a partial cross-sectional view of the cover member shown in FIG. 2.

In an embodiment shown in FIGS. 2 and 3, internal cavity 28 of cover member 26 is defined by a wall 30 having at least one longitudinally extending groove 32. At least a portion of wall 30 engages an outer surface of fluid coupling 10 to create a pocket 33 (see, e.g. FIG. 1) between cover member 26 and body 16 of fluid coupling 10. The longitudinally extending groove 32 defines a fluid flow-path between pocket 33 and an exterior 34 of cap 12 to vent any fluid contained within pocket 33. For example, as cap 12 is placed on fluid coupling 10, air trapped between cap 12 and fluid coupling 10 may be vented through grooves 32 to prevent cap 12 from being forced off after assembly due to trapped air pressure. Additionally, any fluid that leaks past the interface of stem member 24 and fluid coupling 10 during connection may be vented before pressurized fluid can accumulate in pocket 33 and force cap 12 off of fluid coupling 10. As shown in FIGS. 2 and 3, wall 30 may include a plurality of longitudinally extending grooves 32 to further vent fluid from pocket 33.

Alternatively, the inner surface of groove 32 may be deemed a wall having at least one longitudinally extending projection (denoted, for example, by reference numeral 30 in FIG. 2). When so defined, the longitudinally extending projection engages an outer surface of fluid coupling 10 to create pocket 33 between the wall of cover member 26 and fluid coupling 10. Like groove 32, the longitudinally extending projection helps define a fluid flow-path between pocket 33 and exterior 34 of cap 12. Cover member 26 may include a plurality of longitudinally extending projections to further facilitate the transfer of fluid from pocket 33.

In addition to defining a fluid flow-path, the longitudinally extending grooves and projections reduce the surface area of cover member 26 in contact with fluid coupling 10. At relatively low temperatures, cap 12 may shrink around fluid coupling 10 rendering cap 12 difficult to remove. By reducing the surface area of cover member 26 in contact with fluid coupling 10, the forces resisting removal of cap 12 are also reduced.

Referring again to FIG. 1, stem member 24 may include an opening 36 adjacent a distal end 38. A duct 40 is positioned to provide opening 36 in fluid communication with an exterior of stem member 24. Duct 40 provides controlled venting of trapped fluid pressure between seals 22a and 22f when stem member 24 is being removed from fluid coupling 10. Stem member 24 may also include first and second flanges 42 and 44, which may be received within corresponding recesses 46 and 48 in cover member 26 to secure cover member 26 to stem member 24.

As shown in FIGS. 2 and 3, cover member 26 may include a tethering member 50 adapted to secure cap 12 to fluid coupling 10 or apparatus structure (not shown) adjacent cap 12. In an embodiment, tethering member 50 includes a flexible eyelet 52 having an aperture 54 and an elongated channel 56 that extends from aperture 54 and allows eyelet 52 to deform around fluid coupling 10 or the adjacent apparatus structure when fluid coupling 10 or the adjacent apparatus structure is inserted through eyelet 52. Cover member 26 may be made of the same flexible material as tethering member 50, including, without limitation, rubber and plastic.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A fluid coupling assembly, comprising:
   a fluid coupling;
   a cap including a stem member adapted for insertion into the fluid coupling and a cover member connected to the stem member, the cover member including an internal cavity sized to receive the fluid coupling such that the fluid coupling is positioned between the stem member and the cover member, the internal cavity defined by a wall having at least one of a longitudinally extending groove and a longitudinally extending projection; and
   a tethering member adapted to secure the cap to the fluid coupling, wherein the stem member includes an opening adjacent a distal end thereof and wherein a duct is positioned to provide the opening in fluid communication with an exterior of the stem member controlling venting of trapped fluid pressure when the stem member is being removed from the fluid coupling.

2. A fluid coupling assembly, comprising:
   a fluid coupling;
   a cap including a stem member adapted for insertion into the fluid coupling and a cover member connected to the stem member, the cover member including an internal cavity sized to receive the fluid coupling such that the fluid coupling is positioned between the stem member and the cover member, the internal cavity defined by a wall having at least one of a longitudinally extending groove and a longitudinally extending projection; and
   a tethering member adapted to secure the cap to the fluid coupling, wherein the stem member includes first and second flanges received within corresponding recesses in the cover member to secure the cover member to the stem member.

* * * * *

(12) EX PARTE REEXAMINATION CERTIFICATE (10th)
Ex Parte Reexamination Ordered under 35 U.S.C. 257

United States Patent
Wells (10) Number: US 7,695,022 C1
(45) Certificate Issued: Aug. 27, 2014

(54) FLUID COUPLING CAP

(75) Inventor: Michael P. Wells, Bowling Green, OH (US)

(73) Assignee: Eaton Corporation, Cleveland, OH (US)

Supplemental Examination Request:
No. 96/000,031, Nov. 14, 2013

Reexamination Certificate for:
Patent No.: 7,695,022
Issued: Apr. 13, 2010
Appl. No.: 11/170,810
Filed: Jun. 30, 2005

(51) Int. Cl.
*F16L 35/00* (2006.01)

(52) U.S. Cl.
USPC ............ 285/239; 138/89.1; 138/94; 285/331; 285/374; 285/45; 285/901; 285/924

(58) Field of Classification Search
None
See application file for complete search history.

(56) References Cited

To view the complete listing of prior art documents cited during the supplemental examination proceeding and the resulting reexamination proceeding for Control Number 96/000,031, please refer to the USPTO's public Patent Application Information Retrieval (PAIR) system under the Display References tab.

*Primary Examiner* — Patricia Engle (57) ABSTRACT

A cap for a fluid coupling is provided that includes a stem member adapted for insertion into the fluid coupling and a cover member connected to the stem member. The cover member includes an internal cavity sized to receive the fluid coupling such that the fluid coupling is positioned between the stem member and the cover member. The internal cavity is defined by a wall having at least one of a longitudinally extending groove and a longitudinally extending protrusion.

FIG. 1
(Amended)

FIG. 2
(Amended)

FIG. 3
(Amended)

US 7,695,022 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, line 4:

In the embodiment shown in FIG. 1, cap 12 includes a generally cylindrical stem member 24 adapted for insertion into fluid coupling 10, and a cover member 26 connected to stem member 24. *The cap 12 includes a closed end C and an opposite open end O (see FIG. 3). Stem member 24 connects to cover member 26 at the closed end C of cap 12 (see FIG. 3).* Cover member 26 includes an internal cavity 28 sized to receive body 16 of fluid coupling 10 such that fluid coupling 10 is positioned between stem member 24 and cover member 26.

Column 2, line 11:

In an embodiment shown in FIGS, 2 and 3, internal cavity 28 of cover member 26 is defined by a wall 30 having at least one longitudinally extending groove 32. *A length L of each longitudinally extending grove 32 is parallel to the stem member 24 (see FIG. 1). A first radius R1 extends between a longitudinal axis of the cover member 26 and the wall 30 (see FIG. 2). A respective second radius R2 extends between the longitudinal axis and a recessed surface of each groove 32 (see FIG. 2). A depth of each groove 32 is defined by a difference between the first radius R1 and the respective second radius R2.* At least a portion of wall 30 engages an outer surface of fluid coupling 10 to create a pocket 33 (see, e.g. FIG. 1) between cover member 26 and body 16 of fluid coupling 10. *The wall 30 defines a first cylindrical portion CP1 adjacent the open end O of the cap 12, a second cylindrical portion CP2 adjacent the closed end C of the cap 12, and a tapered transition T that provides a diameter reduction from the first portion CP1 to the second portion CP2 (see FIG. 3).* The longitudinally extending groove 32 defines a fluid flow-path. between pocket 33 and an exterior 34 of cap 12 to vent any fluid contained within pocket 33. For example, as cap 12 is placed on fluid coupling 10, air trapped between cap 12 and fluid coupling 10 may be vented through grooves 32 to prevent cap 12 from being forced off after assembly due to trapped air pressure. Additionally, any fluid that leaks past the interface of stem member 24 and fluid coupling 10 during connection may be vented before pressurized fluid can accumulate in pocket 33 and fierce cap 12 off of fluid coupling 10. As shown in FIGS. 2 and 3, wall 30 may include a plurality of longitudinally extending grooves 32 to further vent fluid from pocket 33.

THE DRAWINGS FIGURE HAVE BEEN CHANGED AS FOLLOWS:

adding reference character L in FIG. 1, adding reference characters R1 and R2 in FIG. 2, and adding reference characters O, C, CP1, T and CP2 in FIG. 3.

AS A RESULT OF REEXAMINATION, IT HAS BEEN DETERMINED THAT:

Claims 1 and 2 are determined to be patentable as amended.

New claims 3-30 are added and determined to be patentable.

1. A fluid coupling assembly, comprising:
a fluid coupling;
a cap including a stem member adapted for insertion into the fluid coupling and a cover member connected to the stem member, the cover member including an internal cavity sized to receive the fluid coupling such that the fluid coupling is positioned between the stem member and the cover member, the internal cavity defined by a wall having at least one of a longitudinally extending groove and a longitudinally extending projection *that is elongated along a longitudinal axis of the cover member*; and
a tethering member adapted to secure the cap to the fluid coupling, wherein the stem member includes an opening adjacent a distal end thereof and wherein a duct is positioned to provide the opening in fluid communication with an exterior of the stem member controlling venting of trapped fluid pressure when the stem member is being removed from the fluid coupling.

2. A fluid coupling assembly, comprising:
a fluid coupling;
a cap including a stem member adapted for insertion into the fluid coupling and a cover member connected to the stem member, the cover member including an internal cavity sized to receive the fluid coupling such that the fluid coupling is positioned between the stem member and the cover member, the internal cavity defined by a wall having at least one of a longitudinally extending groove and a longitudinally extending projection *that is elongated along a longitudinal axis of the cover member*; and
a tethering member adapted to secure the cap to the fluid coupling, wherein the stem member includes first and second flanges received within corresponding recesses in the cover member to secure the cover member to the stem member.

3. *The fluid coupling assembly of claim 1, wherein the cover member includes a plurality of longitudinally extending grooves that are elongated along the longitudinal axis of the cover member, wherein a respective depth of each longitudinally extending groove is defined as a difference between a first radius and a respective second radius, wherein the first radius extends between the longitudinal axis of the cover member and the wall, and wherein the respective second radius extends between the longitudinal axis of the cover member and a respective recessed surface of the longitudinally extending groove.*

4. *The fluid coupling assembly of claim 1, wherein the cover member includes a plurality of longitudinally extending projections, each of the longitudinally extending projections being elongated along the longitudinal axis of the cover member.*

5. The fluid coupling assembly of claim 2, wherein the cover member includes a plurality of longitudinally extending grooves that are elongated along the longitudinal axis of the cover member, wherein a respective depth of each longitudinally extending groove is defined as a difference between a first radius and a respective second radius, wherein the first radius extends between the longitudinal axis of the cover member and the wall, and wherein the respective second radius extends between the longitudinal axis of the cover member and a respective recessed surface of the longitudinally extending groove.

6. The fluid coupling assembly of claim 2, wherein the cover member includes a plurality of longitudinally extending projections, each of the longitudinally extending projections being elongated along the longitudinal axis of the cover member.

7. A fluid coupling assembly, comprising:
a fluid coupling;
a cap including a stem member adapted for insertion into the fluid coupling and a cover member connected to the stem member, the cover member including an internal cavity sized to receive the fluid coupling such that the fluid coupling is positioned between the stem member and the cover member, the internal cavity defined by a wall having at least one of a longitudinally extending groove and a longitudinally extending projection that has a length, a width, and a depth, the length being longer than the width and the length being longer than the depth, and the length being parallel to the stem member; and
a tethering member adapted to secure the cap to the fluid coupling, wherein the stem member includes an opening adjacent a distal end thereof and wherein a duct is positioned to provide the opening in fluid communication with an exterior of the stem member controlling venting of trapped fluid pressure when the stem member is being removed from the fluid coupling.

8. The fluid coupling assembly of claim 7, wherein the width is greater than the depth.

9. The fluid coupling assembly of claim 7, wherein the cover member includes a plurality of longitudinally extending grooves that each have a length, a width, and a depth, the length of each longitudinally extending groove being longer than the width of the longitudinally extending groove and the length of each longitudinally extending groove being longer than the depth of the longitudinally extending groove, and the length of each longitudinally extending groove being parallel to the stem member, wherein a respective depth of each longitudinally extending groove is defined as a difference between a first radius and a respective second radius, wherein the first radius extends between the longitudinal axis of the cover member and the wall, and wherein the respective second radius extends between the longitudinal axis of the cover member and a respective recessed surface of the longitudinally extending groove.

10. The fluid coupling assembly of claim 9, wherein the plurality of longitudinally extending grooves includes only four longitudinally extending grooves.

11. The fluid coupling assembly of claim 7, wherein the cover member includes a plurality of longitudinally extending projections that each have a length, a width, and a depth, the length of each longitudinally extending projection being longer than the width of the longitudinally extending projection and the length of each longitudinally extending projection being longer than the depth of the longitudinally extending projection, and the length of each longitudinally extending projection being parallel to the stem member.

12. The fluid coupling assembly of claim 11, wherein the plurality of longitudinally extending projections includes only four longitudinally extending projections.

13. The fluid coupling assembly of claim 7, wherein the stem member includes first and second flanges received within corresponding recesses in the cover member to secure the cover member to the stem member.

14. A fluid coupling assembly, comprising:
a fluid coupling;
a cap including a stem member adapted for insertion into the fluid coupling and a cover member connected to the stem member, the cover member including an internal cavity sized to receive the fluid coupling such that the fluid coupling is positioned between the stem member and the cover member, the internal cavity defined by a wall having at least one of a longitudinally extending groove and a longitudinally extending projection that has a length, a width, and a depth, the length being longer than the width and the length being longer than the depth, and the length being parallel to the stem member; and
a tethering member adapted to secure the cap to the fluid coupling, wherein the stem member includes first and second flanges received within corresponding recesses in the cover member to secure the cover member to the stem member.

15. The fluid coupling assembly of claim 14, wherein the width is greater than the depth.

16. The fluid coupling assembly of claim 14, wherein the cover member includes a plurality of longitudinally extending grooves that each have a length, a width, and a depth, the length of each longitudinally extending groove being longer than the width of the longitudinally extending groove and the length of each longitudinally extending groove being longer than the depth of the longitudinally extending groove, and the length of each longitudinally extending groove being parallel to the stem member, wherein a respective depth of each longitudinally extending groove is defined as a difference between a first radius and a respective second radius, wherein the first radius extends between the longitudinal axis of the cover member and the wall, and wherein the respective second radius extends between the longitudinal axis of the cover member and a respective recessed surface of the longitudinally extending groove.

17. The fluid coupling assembly of claim 16, wherein the plurality of longitudinally extending grooves includes only four longitudinally extending grooves.

18. The fluid coupling assembly of claim 14, wherein the cover member includes a plurality of longitudinally extending projections that each have a length, a width, and a depth, the length of each longitudinally extending projection being longer than the width of the longitudinally extending projection and the length of each longitudinally extending projection being longer than the depth of the longitudinally extending projection, and the length of each longitudinally extending projection being parallel to the stem member.

19. The fluid coupling assembly of claim 18, wherein the plurality of longitudinally extending projections includes only four longitudinally extending projections.

20. A fluid coupling assembly, comprising:
a fluid coupling;
a cap including a stem member adapted for insertion into the fluid coupling and a cover member connected to the stem member, the cover member including an internal cavity sized to receive the fluid coupling such that the fluid coupling is positioned between the stem member and the cover member, the internal cavity defined by a wall having at least one of a longitudinally extending groove and a longitudinally extending projection extending to an open end of the cap; and a tethering member adapted to secure the cap to the fluid coupling, wherein the stem member includes an opening adjacent a distal end thereof and wherein a duct is positioned to provide the opening in fluid communication with an exterior of the stem member controlling venting of trapped fluid pressure when the stem member is being removed from the fluid coupling.

21. The fluid coupling assembly of claim 20, wherein the wall defines a first cylindrical portion adjacent the open end of the cap, a second cylindrical portion adjacent a closed end of the cap, and a tapered transition that provides a diameter reduction from the first cylindrical portion to the second cylindrical portion.

22. The fluid coupling assembly of claim 21, wherein the at least one of a longitudinally extending groove and a longitudinally extending projection extends from the tapered transition of the cap.

23. The fluid coupling assembly of claim 20, wherein the cover member includes a plurality of longitudinally extending grooves that each extend to the open end of the cap, wherein a respective depth of each longitudinally extending groove is defined as a difference between a first radius and a respective second radius, wherein the first radius extends between the longitudinal axis of the cover member and the wall, and wherein the respective second radius extends between the longitudinal axis of the cover member and a respective recessed surface of the longitudinally extending groove.

24. The fluid coupling assembly of claim 23, wherein the longitudinally extending grooves are parallel to the stem member.

25. The fluid coupling assembly of claim 20, wherein the stem member includes first and second flanges received within corresponding recesses in the cover member to secure the cover member to the stem member.

26. A fluid coupling assembly, comprising:
a fluid coupling;
a cap including a stem member adapted for insertion into the fluid coupling and a cover member connected to the stem member, the cover member including an internal cavity sized to receive the fluid coupling such that the fluid coupling is positioned between the stem member and the cover member, the internal cavity defined by a wall having at least one of a longitudinally extending groove and a longitudinally extending projection extending to an open end of the cap; and
a tethering member adapted to secure the cap to the fluid coupling, wherein the stem member includes first and second flanges received within corresponding recesses in the cover member to secure the cover member to the stem member.

27. The fluid coupling assembly of claim 26, wherein the wall defines a first cylindrical portion adjacent the open end of the cap, a second cylindrical portion adjacent a closed end of the cap, and a tapered transition that provides a diameter reduction from the first cylindrical portion to the second cylindrical portion.

28. The fluid coupling assembly of claim 27, wherein the at least one of a longitudinally extending groove and a longitudinally extending projection extends from the tapered transition of the cap.

29. The fluid coupling assembly of claim 26, wherein the cover member includes a plurality of longitudinally extending grooves that each extend to the open end of the cap, wherein a respective depth of each longitudinally extending groove is defined as a difference between a first radius and a respective second radius, wherein the first radius extends between the longitudinal axis of the cover member and the wall, and wherein the respective second radius extends between the longitudinal axis of the cover member and a respective recessed surface of the longitudinally extending groove.

30. The fluid coupling assembly of claim 29, wherein the longitudinally extending grooves are parallel to the stem member.

\* \* \* \* \*